United States Patent [19]

Kurata et al.

[11] 4,442,452
[45] Apr. 10, 1984

[54] TWO-COLOR COPYING MACHINE

[75] Inventors: Masami Kurata; Fujio Moriguchi; Takashi Ohmori; Katsuo Makino, all of Kanagawa, Japan

[73] Assignee: Fuji Xerox Co., Ltd., Tokyo, Japan

[21] Appl. No.: 334,337

[22] Filed: Dec. 24, 1981

[30] Foreign Application Priority Data

Dec. 26, 1980 [JP] Japan .................................. 55-183841

[51] Int. Cl.³ ............................................. H04N 1/46
[52] U.S. Cl. ..................................................... 358/75
[58] Field of Search .................................. 358/75, 280

[56] References Cited

U.S. PATENT DOCUMENTS 3,135,828  6/1964  Simjian ................................. 358/75
3,404,221 10/1968  Loughren ............................. 358/75
4,161,749  7/1979  Erlichman ............................ 358/75
4,247,872  1/1981  Wada et al. ......................... 358/280

Primary Examiner—Richard Murray
Attorney, Agent, or Firm—Sughrue, Mion, Zinn, Macpeak and Seas

[57] ABSTRACT

A two-color copying machine includes a scanner unit for simultaneously generating signals representing different colors on an original document and first and second thermal head assemblies each responsive to signals representing a different color image for recording two different color images on a single recording sheet. If desired, only one of the color portions of the original may be recorded, or they can both be recorded in a single recording color.

15 Claims, 4 Drawing Figures

TWO-COLOR COPYING MACHINE

BACKGROUND OF THE INVENTION

The present invention relates to a two-color copying machine which utilizes two thermal-transfer-type recording mediums of different recording colors for effecting two-color thermal transfer recording.

There have heretofore been known electrostatic photographic two-color copying machines for recording pictures in two colors, such as red and black for example. Such two-color copying machines have a set of electrostatic recording drums or sheet members on which are formed respective electrostatic latent images, which images are then developed with toners of respective hues. The toner images thus produced are transferred, without causing color shifting, onto a sheet of recording paper, and are then thermally fixed to produce a recorded picture. While such a conventional two-color copying machine can produce a number of copies by repeatedly exposing one original document, the copying machine is disadvantageous in that it consumes a great amount of electrical power in thermally fixing the toner image to the recording paper. Since the fixing device of the prior copying machine radiates a large quantity of heat, a heat-shielding mechanism is required to protect other machine parts from such radiated heat, with the result that the overall size of the machine is quite large and it is also expensive to construct.

SUMMARY OF THE INVENTION

The present invention has been made with the foregoing problems in view, and an object of this invention is to provide a two-color copying machine which is capable of producing a number of recorded pictures on a single original document, will consume a reduced amount of electrical power, and is small in size and less costly to construct.

The above objects can be achieved by a copying machine comprising a picture image read-out device which includes a platen for placing thereon an original document to be copied and a scanner unit for reading out a picture image, one of the platen and scanner unit being fixed and the other being movable in a subscanning direction when reading out the picture image to generate picture signals, and also comprising a two-color recording device which utilizes two thermal-transfer-type recording mediums (hereinafter each referred to as an "ink donor sheet") of different colors of effecting bicolor duplication on a sheet of recording paper.

BRIEF DESCRIPTION OF THE DRAWINGS

The present invention will now be described in detail with reference to the accompanying drawings, in which.

DETAILED DESCRIPTION OF THE INVENTION

Figure 1:
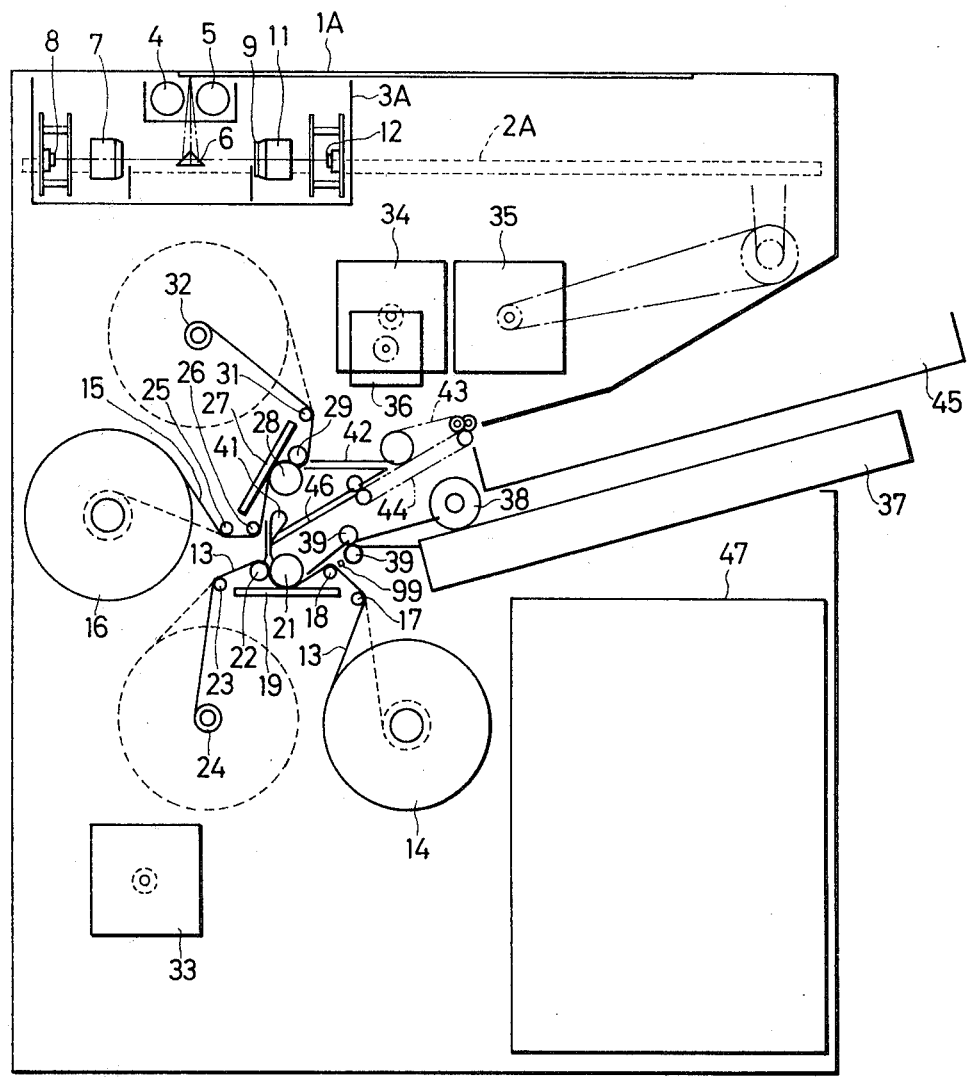
FIG. 1 is a diagrammatic view of a two-color copying machine according to this invention.

FIG. 1 is a diagrammatic view of a two-color copying machine which comprises a picture image read-out device for reading out picture information from an original document to be copied, and a two-color recording device for producing a bicolor recorded picture based on the picture information.

The picture image read-out device includes a fixed platen 1A for placing thereon an original document, and a scanner unit 3A reciprocably movable on a rail 2A mounted parallel to the platen 1A. The scanner unit 3A has therein a pair of fluorescent lamps 4, 5 which are slightly longer than the width of the platen 1A and extend in a direction (main scanning direction) normal to the direction (subscanning direction) in which the scanner unit 3A is movable, the lamps 4, 5 being spaced a predetermined distance from each other. A reflective mirror 6 is disposed below the fluorescent lamps 4, 5 for directing light reflected from the surface of the original document into two directions. In a path of one flux of light reflected by the mirror 6, there are disposed a lens 7 for focusing an image of light and an image sensor 8 for converting the image of light into corresponding electrical signals. In the illustrated embodiment, the image sensor 8 reads out information of a black-colored picture since both the white and red reflected lights will similarly affect the sensors.

Located in a path of the other flux of light reflected by the mirror 6 are a cyan filter 9 for absorbing a red-colored ray of light, a lens 11 for converging the ray of light having passed through the filter 9, and an image sensor 12 for converting the light image into corresponding electrical signals. The image sensor 12 reads out information of black-colored and red-colored images in the illustrated embodiment since only the white reflected light will affect the sensors.

The scanner unit 3A also contains a circuit (described in detail later) for processing picture signals generated as outputs from the image sensors 8, 12. The scanner unit 3A is mounted on the rail 2A for reciprocable movement therealong.

The two-color recording device includes a B-color supply roll 14 comprising a B-colored (Black) ink donor sheet 13 rolled around a tube of paper, and an R-color (Red) supply roll 16 comprising a red ink donor sheet 15 rolled around a tube of paper. The B-colored ink donor sheet 13 is unrolled from the B-colored supply roll 14 and is supplied around a guide roll 17 and a tension take-up roll 18 and then between a B-color thermal head 19 and a B-color backing roll 21. The B-colored ink donor sheet 13 then passes between the B-color banking roll 21 and a B-color drive roll 22, and is wound via a guide roll 23 around a B-color take-up roll 24. The R-colored ink donor sheet 15 is unrolled from the R-color supply roll 16 and is supplied around a guide roll 25 and a tension take-up roll 26 and then between an R-color thermal head 27 and an R-color backing roll 28. Then, the R-colored ink donor sheet 15 passes between the R-color backing roll 28 and an R-color drive roll 29, and is wound via a guide roll 31 around an R-color take-up roll 32. The feeding system for the B-colored ink donor sheet 14 is driven by a B-color printer motor 33, and the feeding system for the R-colored ink donor sheet 15 is driven by an R-color printer motor 34.

A scanner motor 35 and a recording paper motor 36 are located adjacent to the R-color printer motor 34.

The scanner motor 35 comprises a stepper motor for moving reciprocably the scanner unit 3A through belt transmission in a well known manner.

A recording paper motor 36 comprises a stepper motor for supplying sheets of recording paper stacked in a paper feeder 37 through a paper feeding roll 38 to a place where thermal transfer recording is carried out. A sheet of recording paper supplied from the paper feeder 37 is positionally adjusted for registration by a register roll 39, and is then caused to overlap the B-colored ink donor sheet 13 for recording in black between the B-color thermal head 19 and the B-color backing roll 21. A recording paper switching device 41 is disposed above the B-color backing roll 21 and the B-color drive roll 22 for switching the path of advancing movement of the sheet of recording paper after it has passed between the rolls 21, 22. When the recording paper switching device 41 is in the position shown, it will guide the sheet of recording paper peeled off from the B-colored ink donor sheet 22 so that it will overlap the R-colored ink donor sheet 15 and then pass between the R-color thermal head 27 and the R-color backing roll 28 for recording in red. Thereafter, the sheet of recording paper passes through a guide 42 and is discharged by a pair of feed belts 43, 44 into a paper catch tray 45. In an alternate position, the recording paper switching device 41 will guide the sheet of recording paper obliquely upwardly, so that the sheet of recording paper is caused to pass through a guide 46 having an inlet located obliquely upwardly of the rolls 21, 22, and is then discharged by the feed belts 43, 44 into the paper catch tray 45. A box 47 housing a paper supply and a control circut for the copying machine is disposed below the paper feeder 37.

Figure 2:
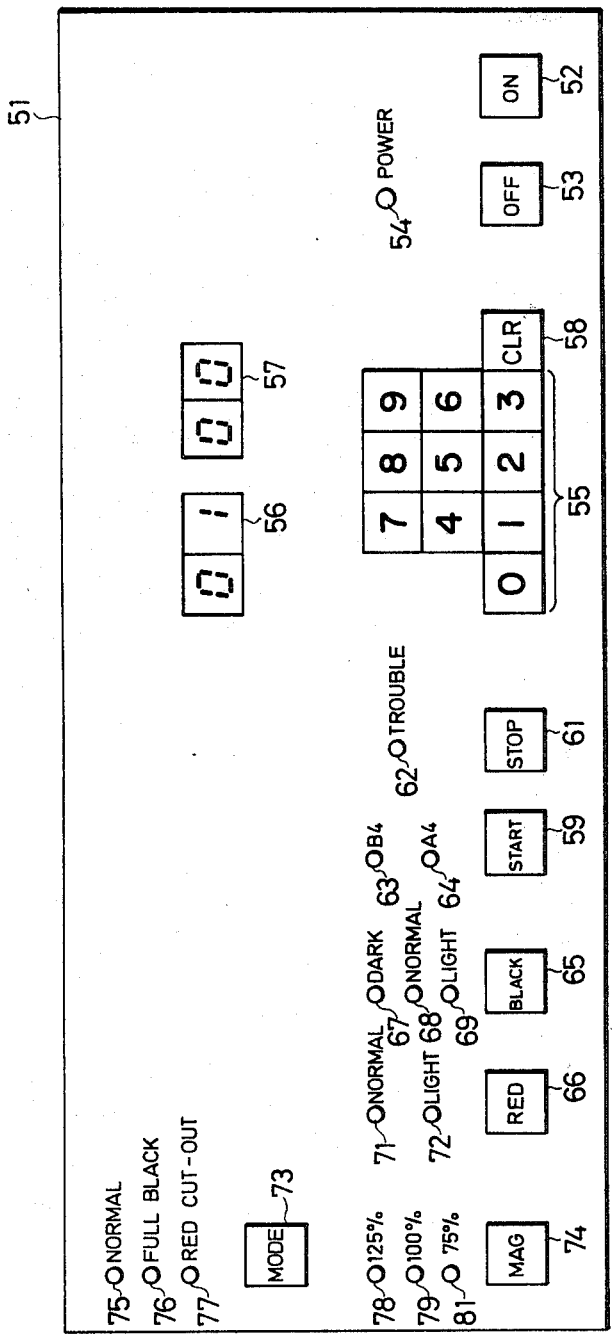
FIG. 2 is a plan view of a control panel.

The construction and copying operation of the two-color copying machine will now be described in more detail. FIG. 2 is illustrative of a control panel of the two-color copying machine. The control panel 51 contains a number of switches and a pair of counters. The power supply is turned on and off by a power supply energizing switch 52 and a power supply de-energizing switch 53, respectively. When the power supply is switched on, a power indicator 54 is lit to thereby let the operator know, with indication of other indicators, that the copying machine is ready for operation. Ten keys 55 set the number of copies to be made, such number being indicated in a set counter 56. An output counter 57 is located adjacent to the set counter 56 for successively indicating the number of copies that have been made. Recording is completed when the counters 56, 57 have the same indications as each other. When it is necessary to change the number indicated by the set counter 56, a clear button 58 is depressed and thereafter the new required number of copoies to be made is set again by the keys 55. However, such new number of copies to be printed can be set in the set counter 56 even if the clear button 58 is not depressed, when the ten keys 55 are manipulated five seconds after the set counter 56 has indicated the previously set number of copies.

A start switch 59 and a stop switch 61 are located substantially centrally of the control panel 51. The start switch 59 when depressed starts the copying operation, and the stop switch 61 when depressed stops the operation of the copying machine. When the sheet of thermosensitive recording paper gets jammed in the copying machine or some other abnormal situation requiring immediate attention takes place, operation of the copying machine will be interrupted even if the stop switch 61 is not depressed. In such cases, a trouble indicator 62 flickers to inform the operation of trouble, and continues to flicker until the operator takes proper corrective action and depresses the clear button 58. While the light 62 flickers, the copying machine will not start to operate even if the the start switch 59 is depressed.

Upwardly of the start switch 59, there are disposed a B4-size indicator 63 and an A4-size indicator 64. The copying machine has a size switch (described later) for determining the width of a sheet of thermosensitive recording paper, and the size indicator 63 or 64 indicates, upon such determination, whether the sheet inserted in the copying machine is of an A4-size or B4-size. Simultaneously therewith, the interval of scanning by the scanner unit and the width of recording by the thermal head are automatically determined to save power consumption and prevent the rolls in the two-color recording device from getting smeared due to printing in unwanted areas where there is no recording paper between the ink donor web and back roller.

A black density changing switch 65 and a red density changing switch 66 are positioned left of the start switch 59. These switches serve to establish several steps of recorded density in black and red by changing in small increments the amount of heat generated by the thermal head. Each time the black density changing switch 65 is depressed, indicators 67–69 indicative of three densities "dark", "normal", and "light" are successively lit one at a time to select and indicate the recording density in black. Likewise, each time the red density changing switch 66 is depressed, either one of indicators 71, 72 indicate one of two densities "normal" and "light" to select the recording density in red.

A mode selection button 73 and a magnification setting button 74 are positioned at the left end of the control panel 25. The mode selection button 73 is provided for selecting colors in which recording is to be effected. Each time the mode selection button 73 is depressed, one of three color modes is selected. When a "normal" mode is selected, a normal indicator 75 is lit. In such a color mode, information of a red picture is recorded in red and information of a black picture is recorded in black. When a full black mode is selected, a full black indicaor 76 is lit. In such a color mode, information of a red picture and information of a black picture are recorded all in black. When a "red cut-out" mode is selcted, a red cut-out indicator 77 is lit. In this color mode, information of a black picture is recorded in black, but information of a red picture is cut out and no recording is effected therefor.

A magnification button 74 is used to select a magnification factor for the duplication. Each time the magnification button 74 is pressed down, the magnification factor is changed cyclically from 125% to 100% to 75%, and such magnification factors are indicated successively by indicators 78, 79, 81.

When the operator places an original document on the platen 1A shown in FIG. 1 and depresses the power supply turnon switch 52 on the control panel 51, the power indicator is lit and the copying machine is energized.

Figure 3:
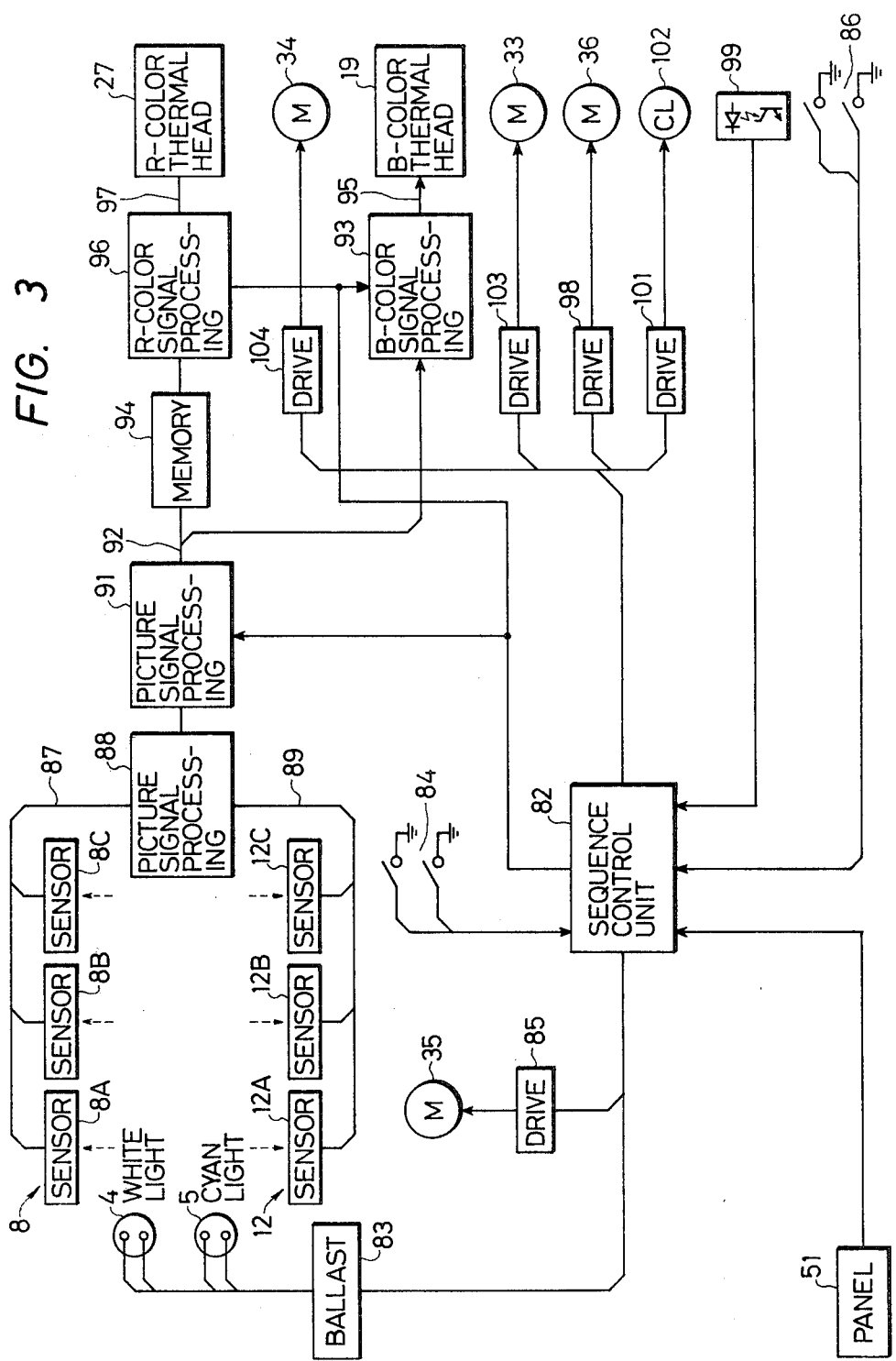
FIG. 3 is a block diagram of an electrical control circuit.

FIG. 3 illustrates an electrical control circuit for the copying machine. When the start button 59 on the control panel 51 is depressed, a sequence control unit 82 determines whether or not the copying machine is ready for operation. If the copying machine is ready with no abnormal conditions present, then the sequence control unit 82 supplies power to a high-frequency ballast 83 to turn on fluorescent lamps 4, 5, e.g., rated at 15 W. At the same time, the sequence control unit determines if the scanner unit 3A is in a start position, based on positional information supplied from scanner position detecting switches 84 located adjacent to the end of the rail 2A (FIG. 1). When the scanner unit 3A is not in the start position, the sequence control circuit 82 supplies power to a motor drive circuit 85 to drive the scanner motor 35 until the scanner unit 3A is set in a home position. In case the scanner unit 3A is not set in such a home position within a predetermined interval of time, the sequence control unit 83 regards such a condition as abnormal, thus de-energizing the copying machine and enabling the trouble indicator 62 to flicker.

On the other hand, when the scanner unit 3A is set in the home position within such a predetermined interval of time, the scanner position detecting switches 84 confirm such a condition, and then the sequence control unit 82 energizes the motor drive circuit 85 with a predetermined timing to drive the scanner motor 35 in a forward or rearward direction, thereby reciprocably moving the scanning unit 3A. When the set counter 56 (FIG. 2) is set at "1" or one copy is to be produced, the sequence control unit 82 controls the scanner motor 35 so that the scanner unit 3A returns rapidly to the home position. When, on the other hand, a number of copies are to be produced, the scanner unit 3A is controlled to move a uniform speed in forward and rearward directions as picture information is read out during both advancing and returning movements of the scanner unit 3A. The distance which the scanner unit 3A moves in a subscanning direction is determined by the sequence control unit 82 based on information as to the size of a recording sheet supplied from the paper size detecting switch 86, positional information supplied from the scanner position detecting switches 84, and the magnification factor selected by the control panel 51. When the scanner unit 3A starts moving in a forward or a rearward direction, the image sensors 8, 12 convert images of light into electrical signals for each line. The image sensors 8, 12 may for example comprise three rectilinearly arranged photodiode arrays; 8A–8C, 12A–12C, respectively, each having 1,024 photoelectric conversion elements for reading out, with a resolving power of 12 dots/mm, picture information of one line on an original document of a B4 size having a width of 256 mm. CCDs (Charge Coupled Devices) or other image pickup elements may be employed for the image sensors 8, 12.

The image sensor 8 which photoelectrically converts the reflected light directly from the original document supplies video signals 87 successively to a first picture signal processing circuit 88 according to clock signals supplied from a clock generator (not illustrated). Such video signals are signals indicative of information of a black picture as determined on brightness. The image sensor 12 which photoelectrically converts the reflected light from the original document after it has passed the cyan filter 9 (FIG. 1) supplies video signals 89 successively to the first picture signal processing circuit 88 according to the foregoing clock signals. The video signals 89 are signals indicating both black and red picture information represnted equally as black-picture information.

The first picture signal processing circuit 88 synthesizes these video signals 87, 89 into two kinds of time serial signals. Such time series signals are then processed to produce a time series signal corresponding to an image of light having passed through a red filter. Thus, there are generated three kinds of picture signals, that is, a white signal corresponding to the brightness of the original document, a cyan signal produced through the cyan filter, and a red signal which is equivalent to that produced through a red filter. The first picture image processing circuit 88 causes these three picture signals to pass through an automatic background control circuit for background correction processing to thereby remove noises (background) of the picture signals. The picture signals are thereafter converted by a binarizing circuit into binary or two-valued signals. Accordingly, three kinds of binary signals are produced which are stable and not adversely affected by a change in the amount of light. The first picture signal processing circuit has a white-line skipping function such that when a line to be read out next is all white (in background color), read-out of such a line will be skipped or omitted. To carry out such a function, it is desirable for the image sensors 8, 12 to be constituted of image pickup elements which can read out two lines at the same time. The sampling of the signals, background correction, digitizing and white line skipping functions may all be performed in the same manner as in copending and commonly assigned application Ser. No. 55-174069 filed Dec. 10, 1981, the complete disclosure of which is incorporated by reference herein.

The binary signals supplied as outputs from the first picture signal processing circuit 88 are supplied to a second picture signal processing circuit 91. The second picture signal processing circuit 91 first prepares signals of red and black pictures by processing the binary signals of white, cyan and red pictures. This involves the simple subtraction of signals and need not be described in detail herein. Such two kinds of generated signals are then subjected to line density conversion, which means conversion of picture signals read out by the image sensors 8, 12 and having a line density of 12 dots/mm in accordance with the magnification selected by the magnification button 74 (FIG. 2). For example, a line density of 12 dots/mm is converted into a line density of 8 dots/mm when the magnification if 100% (no magnification), a line density of 12 dots/mm is converted into a line density of 6 dots/mm when the magnification if 75% (reduction to ⅔), and a line density of 12 dots/mm is converted into a line density of 10 dots/mm when the magnification is 125% (enlargement to 5/4). Converted series binary picture signals 92 are controlled by the sequence control circuit 82 so as to be supplied to a B-color picture signal processing circuit 93 and a picture signal memory 94. The line density conversion functions can be performed in the same manner as in said copending application 55-174069.

Such series binary picture signals 92 can be transmitted as series signals to an external receiver apparatus such as a facsimile receiver. Therefore, the copying machine may have an external transmission terminal for transmitting the series binary picture signals, and such a terminal can be connected via a modem to a telephone ciruit, an interoffice communication circuit, a radio transmission circuit, etc., When the "normal" mode or "red cut-out" mode is selected with the mode selection button 73 (FIG. 3), the B-color picture signal processing circuit 93 writes a series binary picture signal representing only black information into the memory, and reads out the picture signals in a forward or reverse direction depending on the direction of scanning by the scanner unit 3A (FIG.

1). More specifically, since the scanner unit 3A reads out the picture signals on both its advancing and returning movements when a plurality of copies are made, and if the order of read out on the advancing movement is deemed as forward, then the order of read out on the returning movement is regarded as reverse and rearrangement of the picture signals is necessary to prevent the picture image recorded on the returning movement from becoming a mirror image. Therefore, read out from the memory is effected such that if it progresses in a forward direction when the scanner unit advances, then the read out progresses in a rearward direction when the scanner unit returns. Such rearrangement of picture signals is unnecssary when making only one copy of the original document or when receiving picture signals via an external reception terminal. The data rearrangement for reverse direction scanning can be performed in substantially the same manner as in said copending application Ser. No. 55-174069.

The black series binary picture signals read out of the memory are converted from series to parallel and then supplied to the B-color thermal head 19. Thus, a seccession of parallel picture signals are generated for one line, or for one block portion of the line which corresponds to one of separately driven heater groups. Such parallel picture signals are first caused to pass through a recording width control circuit in the processing circuit 93 in which the picture signals are cut out that correspond to regions other than a region where the B-color thermal head 19 is held in contact with the B-color ink donor sheet 13 or alternately only to a width of the recording paper. To that effect, the sequence control unit 82 feeds size information supplied from the recording paper size detecting switch 86 into the B-color picture signal processing circuit 93. The reason for limiting a recording width depending on the size of recording paper is to prevent the B-color baking roll 21 (FIG. 1) from getting dirty due to heating of an unnecessary region of the B-color ink donor sheet 14.

After having passed through the recording width control circuit, the black parallel picture signals are then supplied to a recording density selecting circuit, which controls the peak value (or pulse width) of the parallel picture signals in three steps in accordance with recording densities in black indicated by the control panel 51. Picture signals 95 thus produced are supplied to the B-color thermal head 19.

When the "full black" mode is selected with the mode selection button 73, the B-color picture signal processing circuit 93 is supplied with synthesized black and red picture signals, which are processed into black picture signals, as described above, which are then supplied to the B-color thermal head 19.

The picture signal memory 94 is a delay memory which serves to effect bicolor recording without allowing generation of color shifting or misalignment on a sheet of recording paper which passes over both the B-color thermal head 19 and the R-color thermal head 27 as shown in FIG. 1. In the illustrated embodiment, the heater resistors of the thermal heads are spaced from each other by a distance of 100 mm, and the picture signal memory 94 has a capacity of about 1.6 M bits depending on the speed of travel of the recording paper.

The picture signal memory 94 is supplied with the red series binary picture signals only when the "normal" mode is selected with the mode selection button 73. Such picture signals are supplied to an R-color picture signal processing circuit 96 upon lapse of a predetermined delay time. The R-color picture signal processing circuit 96 processes the supplied signals, in the same manner as the B-color picture signal processing circuit 93, into picture signals 97 which are then fed to the R-color thermal head 27. In a recording density selection circuit of the R-color picture signal processing circuit 96, the peak value (or pulse width) of the parallel picture signals is controlled in two steps in conformity with recording densities in red indicated by the control panel 51.

When the start button 59 is depressed with no abnormal condition present in the copying machine to thereby set the scanner unit 3A in the home position, the sequence control unit 83 supplies power to a recording paper motor drive circuit 98 to energize the recording paper feeding motor 36. When the recording paper feeding motor 36 is operated, a sheet of recording paper is fed by the feed roll 38 out of the paper feeder 37. The feed roll 38 continues rotating until the leading edge of the sheet of recording paper goes past the register rolls 39 and is sensed by a register sensor 99 located immediately downsteam of the register rolls 39. Upon sensing by the register sensor 99 of the sheet of recording paper, the sequence control unit 82 energizes a clutch drive circuit 101 to operate an electromagnetic clutch 102, whereupon the feed roll 38 is disconnected from the recording paper feed motor 36 and the sheet of recording paper is fed by the register rolls 39.

When the register sensor 99 senses the sheet of recording paper, the sequence control unit 82 starts counting pulses which the recording paper motor drive circuit 98 supplies to the recording paper feed motor 36. When the leading edge of the sheet of recording paper reaches a point immediately in front of the heating resistor of the B-color thermal head 19, the sequence control unit 82 energizes a B-color motor drive circuit 103 to drive the B-color printer motor 33. At this time, the B-colored ink donor sheet 13 starts to be fed. This is to avoid unnecessary consumption of the B-colored ink donor sheet 13.

When the B-colored ink donor sheet 13 starts being fed, the sheet of recording paper passes between the B-color thermal head 19 and the B-color backing roll 21. At this time, the b-colored ink donor sheet 13 is prevented from being wrinkled by the atuomatic balancing tension takeup roll 18 which is displacable under the tension applied to the sheet. The B-colored ink donor sheet 14 comprises a base coated on one surface thereof with thermally fusible or thermally sublimatable black solid ink, which is fused or sublimated upon being heated by the B-color thermal head 19 that is selectively heated in response to the picture signals 95, whereby black ink is thermally transferred to the sheet of recording paper.

The amount of feed of the sheet of recording paper per one scanning line, as effected by the B-color backing roll 21 driven by the B-color drive roll 22, varies with the magnification factor selected by the control panel 51, the relationships between the magnification and the feed rate being 75%:100%:125%=3:4:5.

The sheet of recording paper as printed passes between the B-color backing roll 21 and the B-color drive roll 22 while overlapping the B-colored ink donor sheet 13. Then, the B-colored ink donor sheet 13 abruptly changes its path and is wound around the B-colored ink donor sheet takeup roll 24 loaded with a predetermined force by a slip friction clutch. The sheet of recording paper is separated from the B-color ink donor sheet 14, since the former cannot follow the sudden change of path of the B-colored ink donor sheet 13.

The separated sheet of recording paper is guided by the recording paper switching device 41 to move toward the R-color thermal head 27 only when the mode selection button 73 (FIG. 2) indicates the "normal" mode. When the leading edge of the sheet of recording paper arrives at a point just in front of the heating resistor of the R-color thermal head 27 as determined by the count of the above-mentioned pulses, the sequence control until 82 energizes the R-color motor drive circuit 104 to drive the R-color printer motor 34. At this time, the R-color ink donor sheet 15 starts being fed for thermal transfer recording.

The R-color ink donor sheet 15 comprises a base coated on one surface thereof with thermally fusible or thermally sublimatable red solid ink, which is fused or sublimated upon being heated by the R-color thermal head 27 that is selectively heated in response to the picture signals 97, whereby red ink is thermally transferred to the sheet of recording paper.

The amount of feed of the sheet of recording paper per one scanning line as effected by the R-color backing roll 28 driven by the R-color drive roll 29 is also adjusted by the selected magnification factor.

The sheet of recording paper as thus printed is separated from the R-color ink donor sheet 15 in the same manner as described above, and is discharged via the guide 42 and the feed belts 43, 44 into the paper catch tray 45.

When the "full black" mode or the "red cut-out" mode is selected by the mode selection button 73, the recording paper switching device 41 guides the sheet of recording paper into the guide 46. Then, the sheet of recording paper is discharged by the feed belts 43, 44 into the paper catch tray 45 without being printed in red. Based on the count of the above-mentioned pulses, the sequence control unit 82 controls the timing for stopping the B-color printer motor 33 and the R-printer motor 34. When the recording operation is completed, the sequence control unit 82 commands the copying machine to be in a standby mode for the next copying operation.

Since the platen 1A of the copying machine according to the foregoing embodiment is fixed, there is no danger of damaging an original document as is the case with a movable platen.

Figure 4:
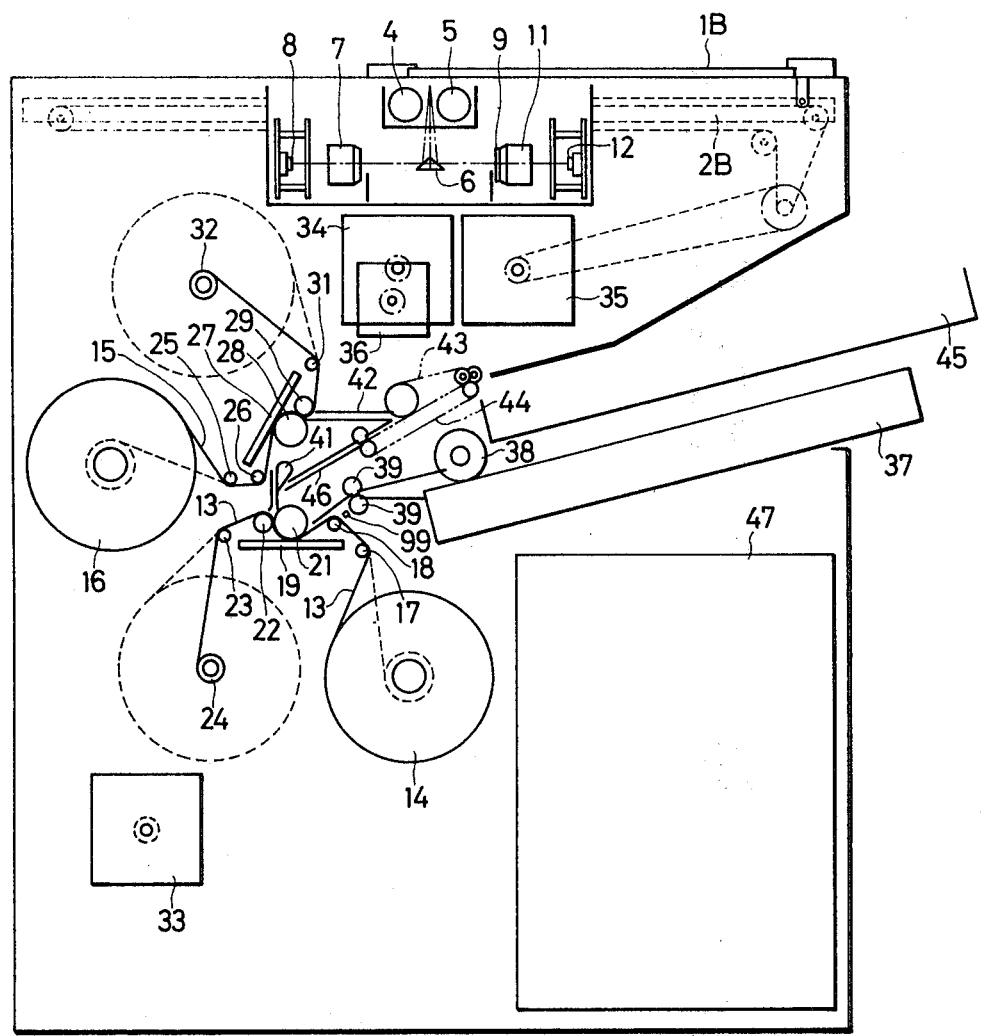
FIG. 4 is a diagrammatic view of a two-colored copying machine according to a modification of the invention.

FIG. 4 shows a modified two-color copying machine. Like parts are denoted by like reference numerals in FIGS. 1 and 4. The two-color copying machine illustrated in FIG. 4 includes a different picture image read-out device for reading picture information out of an original document to be copied. Only this device will be described, and no further description of other parts will be given since they are the same as those of the foregoing embodiment.

The picture image read-out device comprises a platen 1B reciprocably mounted on a rail 2B attached to an upper portion of the copying machine proper, and a fixed scanner unit 3B for reading out picture information through raster scanning. The control circuitry for the embodiment of FIG. 4 is the same as shown in FIG. 3, except that the switches 84 detect platen rather than read unit position. With the copying machine according to the second embodiment, when the start switch 59 is depressed, the platen 1B is set in a home position based on positional information supplied from a platen position detecting switch 84. When the platen 1B is not set in such a home position within a predetermined interval of time, the sequence control unit 82 regards such a condition as abnormal, thus de-energizing the copying machine and enabling the trouble indicator 62 (FIG. 2) to flicker. On the other hand, when the platen 1B is set in the home position within the required time interval, such a condition is confirmed by the platen position detecting switch 84. Then, the sequence control unit 51 energizes the motor drive circuit 85 at a predetermined timing to rotate a platen motor 35 in a forward or reverse direction for reciprocable movement of the platen 1B. For producing a single copy, the sequence control unit 82 controls the platen 1B rapidly back to the home position. For printing a number of copies, however, the platen 1B moves at a uniform speed on its forward and rearward stroke as picture information is read out in both forward and rearward movements of the platen 1B. The distance that the platen 1B is to move in a subscanning direction is determined by the sequence control unit 82 based on size information supplied from the recording paper size sensing switch 86, positional information supplied from the platen position detecting switch 84, and the magnification factor selected by the control panel 51.

When the platen 1B thus starts moving in a forward or rearward direction, the image sensors 8, 12 in the scanner unit 3B convert an image of light for one line into electrical signals. Video signals 57, 59 thus generated are processed by the picture signal processing circuits 88, 91, 93, 96. The back and red picture signal processing circuits 93, 96 rearrange picture signals generated upon scanning by the platen 1B moving in the rearward direction. Picture signals 95, 97 produced as outputs from the picture signal processing circuits 93, 96 are then supplied to the corresponding thermal heads 19, 27 for recording on the sheet of recording paper in desired colors.

Since the platen 1B of the modified copying machine as described above is movable, the copying machine can be designed so as to be relatively small in size.

According to the present invention, the thermal transfer recording system is employed for enabling picture information to be recorded on ordinary paper with a reduced amount of power consumption.

While in the illustrated embodiments the two-colored copying machine has been described mainly for its copying operation, the copying machine can effect transmission of picture images to and reception of such images from external apparatus since the machine is equipped with a device for reading out picture information and a device for recording such picture information. With the use of such external apparatus, therefore, picture image processing such as image synthesis, removal of a portion of the image, or image shifting is possible externally of the machine, and thereafter the processed image can be fed back to the machine for producing a recorded picture. Where a great amount of picture information is to be transmitted to or received from an external apparatus, means for communication by light using optical fibers can be put to effective use. While in the illustrated embodiment recording colors are black and red, the present invention is not limited to such colors.

What is claimed is:

1. A two-color copying machine comprising a platen for placing thereon an original document to be copied, a scanner unit for reading out one line at a time from said original document during relative movement between said platen and scanner unit and for generating picture signals representing at least two different colors, first and second thermal heads having respective heaters and responsive to reception of picture signals for selectively heating said heaters, first ink donor sheet supply means for supplying a first ink donor sheet which records in a first recording color to the heaters of said first thermal head, second ink donor sheet supply means for supplying a second ink donor sheet which records in a second recording color different from said first recording color to the heaters of said second thermal head, first transfer means for pressing a severed sheet of recording paper intimately against said first thermal head with said first ink donor sheet interposed therebetween to record a first color image on said sheet, second transfer means for pressing said sheet of recording paper against said second thermal head with said second ink donor sheet interposed therebetween to record a second color image on said sheet, and paper discharge means for discharging said sheet of recording paper.

2. A two-color copying machine according to claim 1, including a copying machine body, said platen being fixed to said copying machine body, and said scanner unit being reciprocably movable.

3. A two-color copying machine according to claim 1, including a copying machine body, said scanner unit being fixed to said copying machine body, and said platen being reciprocably movable.

4. A two-color copying machine according to claim 1, wherein said scanner unit includes read-out means having two image sensors for simultaneously reading out different color picture information from one line on said original document, said machine including processing means for processing the read-out picture information into said picture signals representing two different colors.

5. A two-color copying machine according to claim 1, including delay means for delaying the picture signal to be supplied to said second thermal head with respect to the picture signal to be supplied to said first thermal head by a difference in time between the thermal transfer recording by said first transfer means and the thermal transfer recording by said second transfer means.

6. A two-color copying machine according to claim 1, including sheet passage switching means between said first and second thermal heads and switchable between a first position in which said recording paper sheet is forwarded to said discharge means without passing said second thermal head and a second position in which said recording paper is forwarded to said second thermal head.

7. A two-color copying machine according to claim 1, including a picture image signal processing circuit for providing picture signals of both colors to one of said first and second thermal heads to thereby record a single color image corresponding to both colors in said original document.

8. A two-color copying machine according to claim 1, including means for skipping the processing of signals from any line on said original which is wholly white.

9. A two-color copying machine according to claim 1, wherein said sheet of recording paper is conveyed through said machine by the ink donor sheets adhering thereto.

10. A two-color copying machine according to claim 1, including a memory for writing therein picture signals indicative of one line supplied from said scanner unit, and memory read-out means for inverting the order of picture signals read out of said memory dependent upon the direction of relative movement between said platen and scanner unit, such that a positive picture image can be recorded by the picture signals read out in either direction of movement.

11. A two-color copying machine according to claim 1, including means for detecting the size of the sheet of recording paper, and means for limiting the total width of energized heating elements in accordance with said detected size.

12. A two-color copying machine according to claim 1, including means for determining the size of the original document, and means responsive to said determined size for limiting the range of relative movement between said scanner unit and platen.

13. A two-color copying machine according to claim 1, including signal input and output terminals for transmission of the picture signals to and reception of picture signals from external devices.

14. A two-color copying machine according to claim 1, having a variable magnification factor, wherein said original image is read out with a resolution of X picture elements per millimeter and said heaters are energized with a spacing of Y heater elements per millimeter, and said magnification factor is varied by varying the value Y.

15. A two-color copying machine according to claim 1, wherein said machine has a variable magnification factor and the feed rate of said recording sheet past said first or second thermal heads is controlled in accordance with said magnification factor.

* * * * *